UNITED STATES PATENT OFFICE.

CHRISTIAN RUDOLPH, OF OFFENBACH-ON-THE-MAIN, GERMANY, ASSIGNOR TO THE FIRM OF K. OEHLER, OF SAME PLACE.

BROWN AZO DYE.

SPECIFICATION forming part of Letters Patent No. 465,116, dated December 15, 1891.

Application filed July 17, 1889. Serial No. 317,964. (Specimens.) Patented in Germany June 6, 1889, No. 58,657; in England July 9, 1889, No. 11,000, and in Italy November 30, 1889, XXIII, 25,831 and LII, 81.

*To all whom it may concern:*

Be it known that I, CHRISTIAN RUDOLPH, a subject of the Emperor of Germany, and a resident of Offenbach-on-the-Main, Germany, have invented new and useful Improvements in Brown Azo Dye-Stuffs, (for which patents have been issued in Germany, No. 58,657, dated June 6, 1889; in England, No. 11,000, dated July 9, 1889, and in Italy, XXIII, 25,831 and LII, 81, dated November 30, 1889,) of which the following is a specification.

This invention relates to a certain new and useful improvement in the production of a new brown azo dye-stuff. This coloring matter, which has not been described hitherto, has the property of dyeing unmordanted cotton in an alkaline bath brown.

My way of proceeding is as follows: A solution cooled to 0° of fifteen parts of the sodium salt of the toluylenediamine sulpho-acid 1:2:4:6 ($CH_3:NH_2:SO_3H:NH_2$) and a solution of 6.9 parts of nitrite of sodium in five hundred parts of water are poured slowly into diluted muriatic acid (containing sixty parts of muriatic acid of 22.5° Baumé) and cooled with ice. As soon as no nitrous acid can be found any more in these mixed liquids I add a solution of twenty-one parts of metaphenylenediamine sulphate and one hundred parts crystallized acetate of sodium in one thousand parts of water. The intermediate compound (toluylenediamine sulpho-acid-disazo-metaphenylenediamine) obtained in this way is formed at once and separates as a dark-brown precipitate, which is treated, still in humid state, with 24.4 parts of diazo alpha or beta naphthylamine sulpho-acid and fourteen parts of acetate of sodium dissolved in water.

The formation of the new dye-stuff takes place slowly and can be accelerated by heating moderately the mass. When the reaction is finished, the liquid is neutralized with soda, boiled, filtered, and precipitated with salt.

The dye-stuff forms a blackish powder with a greenish hue. It dissolves in concentrated sulphuric acid with a brown violet-red color and in water with a brown color, which is little altered by alkalies. The acid of the dye-stuff is difficultly soluble in cold water.

Having thus described my invention and the manner of employing the same, what I claim, and wish to secure to me by Letters Patent of the United States of America, is—

1. The process of making a new brown azo dye-stuff by first combining diazotized toluylenediamine sulpho-acid 1:2:4:6 ($CH_3:NH_2:SO_3H:NH_2$) and two molecules of metaphenylenediamine, and further treating this intermediate compound with diazotized alpha or beta naphthylamine sulpho-acid, substantially as herein described.

2. The new brown azo dye-stuff herein described, which is a blackish powder with a greenish hue, dissolving in concentrated sulphuric acid with a brown violet-red color and in water with a brown color, which is little altered by alkalies and its acid being difficultly soluble in cold water, substantially as set forth.

In testimony whereof I have signed my name to this specification in the presence of two subscribing witnesses.

CHRISTIAN RUDOLPH.

Witnesses:
JOSEPH PATRICK,
ALVESTO S. HOGUE.